(12) United States Patent
Von Wissel et al.

(10) Patent No.: US 11,203,995 B2
(45) Date of Patent: Dec. 21, 2021

(54) METHOD FOR CONTROLLING EMISSIONS OF NITROGEN OXIDES IN EXHAUST OF INTERNAL COMBUSTION ENGINE

(71) Applicant: NISSAN MOTOR CO., LTD., Yokohama (JP)

(72) Inventors: Dirk Von Wissel, Boulogne Billancourt (FR); Jamil Abida, Bouray sur Juine (FR)

(73) Assignee: NISSAN MOTOR CO., LTD., Yokohama (JP)

( * ) Notice: Subject to any disclaimer, the term of this patent is extended or adjusted under 35 U.S.C. 154(b) by 352 days.

(21) Appl. No.: 16/479,684

(22) PCT Filed: Jan. 26, 2018

(86) PCT No.: PCT/EP2018/051929
§ 371 (c)(1),
(2) Date: Jul. 22, 2019

(87) PCT Pub. No.: WO2018/138245
PCT Pub. Date: Aug. 2, 2018

(65) Prior Publication Data
US 2021/0332769 A1    Oct. 28, 2021

(30) Foreign Application Priority Data
Jan. 30, 2017  (FR) ...................................... 1750719

(51) Int. Cl.
*F02D 41/00*    (2006.01)
*F02D 41/02*    (2006.01)
(Continued)

(52) U.S. Cl.
CPC ......... *F02D 41/1463* (2013.01); *F01N 3/208* (2013.01); *F02D 41/0055* (2013.01);
(Continued)

(58) Field of Classification Search
CPC ........ F01N 3/2066; F01N 3/208; F01N 11/00; F01N 2560/026; F01N 2570/14;
(Continued)

(56) References Cited

U.S. PATENT DOCUMENTS 5,561,238 A * 10/1996 Rumez .................. B60K 28/10
123/703
6,487,850 B1 * 12/2002 Bidner .................. F01N 3/0807
60/285

(Continued)

*Primary Examiner* — Audrey B. Walter
*Assistant Examiner* — Dapinder Singh
(74) *Attorney, Agent, or Firm* — Foley & Lardner LLP

(57) ABSTRACT

The invention relates to a control method that allows the mean quantity of nitrogen oxides per kilometer covered emitted by a vehicle fitted with an internal combustion engine associated with a post-treatment system to be kept below a predefined fixed threshold, for any journey made by the vehicle. The mean quantity emitted over a fixed elementary distance that has just been covered by the vehicle is calculated iteratively, together with a long-term conformity factor which is equal to the mean quantity emitted over the entire distance covered since the start of the journey. When it is found that the long-term conformity factor is above the threshold, the engine and/or the post-treatment system is regulated in such a way as to obtain, over the next fixed elementary distance, a mean quantity of nitrogen oxides per kilometer that is lower than the threshold value FC, for example equal to 90% of the threshold, whatever the engine operating point. Thus, the long-term conformity factor converges towards the threshold.

10 Claims, 3 Drawing Sheets

(51) Int. Cl.
    *F01N 3/20* (2006.01)
    *F02D 41/14* (2006.01)
(52) U.S. Cl.
    CPC ..... *F02D 41/0245* (2013.01); *F02D 41/0275* (2013.01); *F01N 2900/08* (2013.01); *F01N 2900/102* (2013.01); *F01N 2900/1402* (2013.01); *F01N 2900/1812* (2013.01); *F02D 2200/023* (2013.01); *F02D 2200/101* (2013.01); *F02D 2200/1002* (2013.01); *F02D 2200/701* (2013.01)
(58) Field of Classification Search
    CPC .......... F01N 2610/02; F01N 2900/102; F01N 2900/1402; F01N 2900/1812; F01N 2900/08; F02D 29/02; F02D 41/0245; F02D 41/0055; F02D 41/0052; F02D 41/0235; F02D 41/1463; F02D 41/0275; F02D 2200/101; F02D 2200/1002; F02D 2200/701; F02D 2200/023; F02D 2250/36; F02M 26/05; F02M 26/06; F02M 26/15; Y02A 50/20; Y02T 10/12; Y02T 10/40
    See application file for complete search history.

(56) References Cited

U.S. PATENT DOCUMENTS

| | | | |
|---|---|---|---|
| 10,450,930 B2 * | 10/2019 | Smith | F01N 3/101 |
| 10,584,976 B2 * | 3/2020 | Kim | F02D 41/027 |
| 2015/0260074 A1 * | 9/2015 | Argolin, I | F02D 41/027 |
| | | | 701/102 |
| 2018/0170349 A1 * | 6/2018 | Jobson | G08G 1/123 |

* cited by examiner

METHOD FOR CONTROLLING EMISSIONS OF NITROGEN OXIDES IN EXHAUST OF INTERNAL COMBUSTION ENGINE

TECHNICAL FIELD

The invention relates to a method for controlling nitrogen oxide emissions from combustion gases of an internal-combustion engine, notably a diesel engine.

BACKGROUND ART

Reducing polluting emissions in exhaust of internal-combustion engines, and more specifically the internal-combustion engines in motor vehicles, which are subject to increasingly stringent legal constraints, is a strategic challenge.

To do so, post-treatment systems for combustion gases from an internal-combustion engine are usually used to treat different types of pollutants (for example: carbon monoxide CO, unburnt hydrocarbons HC, nitrogen oxides $NO_x$, soot, etc.) emitted in these gases.

To limit more specifically discharge into the atmosphere of nitrogen oxide molecules (essentially nitrogen monoxide NO and nitrogen dioxide $NO_2$), which are harmful to health and to the environment, many engines are fitted with an NO trap and/or a selective reduction catalyst for nitrogen oxides, in order to reduce incoming nitrogen oxides into inoffensive molecules (nitrogen $N_2$ and water $H_2O$).

Attached FIG. 1 shows benefit of such post-treatment systems. This figure shows time t on X-axis, molar concentration in nitrogen oxides on the left-hand scale of Y-axis, and speed V of a motor vehicle with an internal-combustion engine, for example a diesel engine, on the right-hand scale of the Y-axis.

Curve 1000 typically represents speed profile of a vehicle over a portion of the standard New European Driving Cycle (NEDC). Curve 2000 represents instantaneous change in a concentration of nitrogen oxides $[NO_x]_{tp}$ at an outlet of an exhaust box of the vehicle, i.e. downstream of post-treatment systems for nitrogen oxides ($NO_x$ trap and/or SCR catalytic converter).

Total mass of nitrogen oxides produced by the engine in the New European Driving Cycle (NEDC) results from nitrogen oxide concentration profile $[NO_x]_{tp}$ over duration of the cycle, a portion of which is illustrated in FIG. 1. More specifically, this is the time integral, over the entire duration of the cycle, of a flow rate of exhaust gases multiplied by a concentration of nitrogen oxides present in these gases at an outlet of the post-treatment system or systems. The law governs the mean value of this mass per traveled kilometer over the New European Driving Cycle (NEDC). For example, the standard "Euro 6b" limits this mean quantity of $NO_x$ to 80 g/km, with the complete cycle being 11 traveled kilometers.

Without the post-treatment system, the concentration of nitrogen oxides at the outlet of the exhaust box $[NO_x]_{tp}$ would be equal to a concentration of nitrogen oxides at an outlet of the engine $[NO_x]_{eo}$ and the total mass of nitrogen oxides emitted over the cycle would be significantly greater than permitted by the standard, in consideration of technological limits on combustion in engines.

With at least one post treatment system that has a high-level of treatment efficiency E, i.e. a high rate of reduction of nitrogen oxides, for example an efficiency that can reach a value of 90% under optimum operating conditions, the standard can be met, since the concentration of nitrogen oxides at the outlet of the exhaust box of the vehicle $[NO_x]_{tp}$ is only a relatively low untreated fraction of the concentrations omitted by the engine $[NO_x]_{eo}$, according to equation 1 below:

$$[NO_x]_{tp} = (1-\varepsilon) \times [NO_x]_{eo} \qquad \text{(Equation 1)}$$

It is therefore responsibility of each manufacturer to adjust firstly the $NO_x$ emissions in the combustion gases of the engine and secondly the treatment efficiency of the post-treatment systems for the gases at different operating points of the engine making up the New European Driving Cycle (NEDC) to ensure that this overall maximum mean quantity of nitrogen oxides at the outlet of the exhaust box is compliant.

In general, it is known to set the $NO_x$ emissions of the engine to a concentration value $[NO_x]_{eo}$ as a function of a set of parameters representative of an operating point of the engine including at least an engine speed N, a load C and a value representative of an operating temperature of the engine, for example water temperature $T_{eau}$. This setting, which is performed during a calibration phase on the engine test bench then loaded into a processor of the vehicle, includes:

setting parameters of air path of the engine: mass of air $M_{air}$ and of burnt gases $M_{gbr}$ required in a combustion chamber, and setting parameters of fuel path: fuel mass Mf and crankshaft angle $\theta_f$ at which fuel is injected (once or more than once).

It is notably known that increasing a proportion of exhaust gases (at low and/or high pressure) recycled at an intake helps to reduce nitrogen oxides emitted in the combustion gases of the engine.

It is also known to adjust the treatment efficiency $\varepsilon$ of the post-treatment systems as a function of the operating point of the engine and of the nitrogen oxide emissions $[NO_x]_{eo}$ corresponding thereto.

For example, for an $NO_x$ trap, frequency and/or duration of purges can be adjusted to limit a mass of nitrogen oxides stored in the trap, the efficiency being a function of the stored mass. If the trap is relatively cold, the trap can be heated to a temperature at which the efficiency thereof is greater.

Again, for example, for a selective reduction catalyst for nitrogen oxides, a flow rate of reducing agent (Adblue®) injected into the catalytic converter to permanently adjust a mass of ammonia stored therein to a given mass value that determines the efficiency thereof can be adjusted. It is known that efficiency is the highest when the stored mass is close to the maximum ammonia storage capacity (ASC) of the catalytic converter.

However, each operating point of the engine included in the New European Driving Cycle (NEDC) usually has a single setting, referred to as a nominal setting, which is reproduced on the vehicle each time that the same parameters representative of the operating point of the engine (load, engine speed, water temperature, etc.) are present, and the different operating points of the engine do not result in identical emission quantities of nitrogen oxides, as shown by the significant variations in the curve 2000 in FIG. 1. Furthermore, outside of this standardized cycle, the other operating points of the engine, which can be found regularly during ordinary use of the vehicle (urban, road and freeway cycles) also usually have a single nominal setting, emitting a greater or lesser quantity of nitrogen oxides and not a constant mean quantity of nitrogen oxides.

Using extensive statistical experience of real driving cycles of vehicles and of modeling of occurrence of operating points of the engine that are associated with these real cycles, automobile manufacturers can select some nominal settings for the different operating points of the engine that enable, with a high calculated probability, achievement of a mean quantity of nitrogen oxides per kilometer for any given real driving cycle that is within predefined limits, for example a multiple of the legal limit for the cycle, such a limit also being known as the conformity factor (FC) threshold.

Nonetheless, since this is a statistical approach, it is not possible to guarantee that such a threshold will never be exceeded for a specific real cycle, in particular in extreme usage conditions (for example a particularly severe cycle in terms of engine load or transients).

SUMMARY OF INVENTION

The invention proposes overcoming the drawbacks related to known nitrogen oxide treatment methods, and more specifically the unsuitability of such methods for controlling the quantities admitted over any given driving cycle.

To do so, the invention proposes a method intended to keep a mean quantity of nitrogen oxides per traveled kilometer that is emitted by a vehicle below a fixed predetermined threshold over any given sufficiently long journey of the vehicle. "Sufficiently long" shall mean that the journey enables the post-treatment system to reach an adequate operating temperature (for example approximately 170° C. for an $NO_x$ trap, or 200° C. for a selective reduction catalyst for nitrogen oxides).

The invention proposes a method for controlling emissions of nitrogen oxides at an outlet of an exhaust box of a motor vehicle fitted with an internal-combustion engine associated with at least one post-treatment system for nitrogen oxides emitted in combustion gases of the engine, including at least one stage for determining a mean quantity of nitrogen oxides per traveled kilometer emitted by the vehicle from a start of a journey to a time the vehicle is stopped, characterized in that it includes, iteratively at each step of fixed elementary distance traveled, from the start of the journey and until the vehicle is stopped:
  a stage in which a short-term conformity factor equal to a mean quantity of nitrogen oxides per traveled kilometer emitted over the elementary distance that has just been traveled, and a long-term conformity factor equal to a mean quantity of nitrogen oxides per traveled kilometer over a distance traveled from the start of the journey are calculated,
  a stage in which the long-term conformity factor is compared to a threshold, and
  a stage in which, when the long-term conformity factor is greater than the threshold:
  (i) a set of parameters representative of an operating point of the engine is determined, including at least a torque of the engine, a speed of the engine and a water temperature of the engine, and
  (ii) the engine and/or the post-treatment system are set to provide a concentration of nitrogen oxides at the outlet of the exhaust box of the vehicle that ensures that the short-term conformity factor determined in a following distance step is strictly below the threshold.

BRIEF DESCRIPTION OF DRAWINGS

Other features and advantages of the invention are set out in the description of a non-limiting embodiment thereof, provided with reference to the attached drawings, in which.

DESCRIPTION OF EMBODIMENTS

Figure 1:
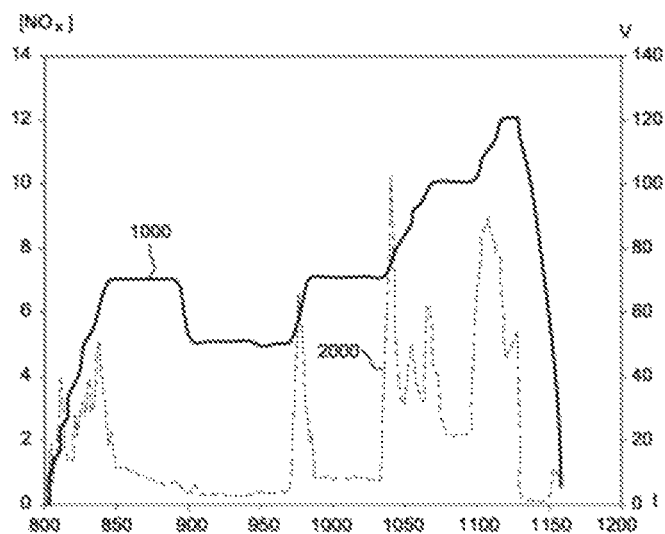
FIG. 1 shows nitrogen oxide emissions of a vehicle fitted with an internal-combustion engine over a portion of the New European Driving Cycle (NEDC)

FIG. 1 has already been described above and requires no additional comment.

Figure 2:
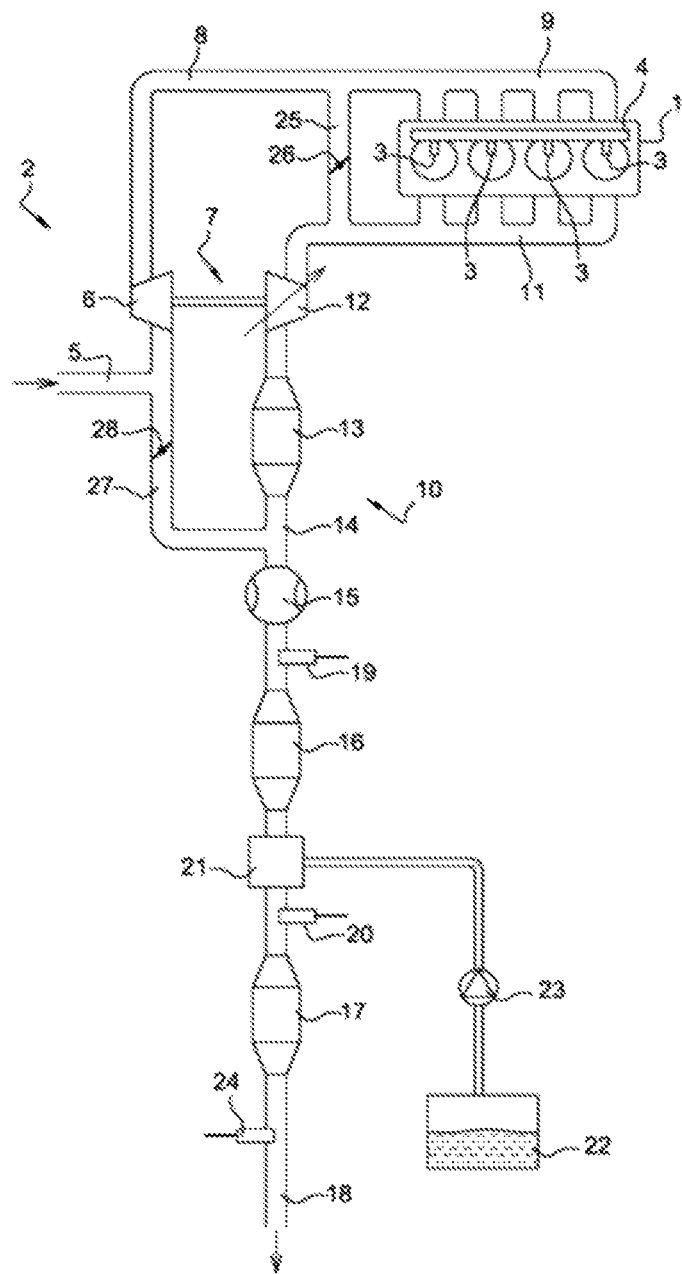
FIG. 2 shows a motorization device designed to implement the method according to the invention.

FIG. 2 shows a motorization device designed to implement the method according to the invention. This device is an internal combustion engine 1, for example a diesel engine of a motor vehicle, in this case a four-cylinder inline supercharged engine. The engine 1 is supplied with air by an air intake circuit 2 and with fuel, for example diesel, by a plurality of injectors 3 mounted on a fuel-injection common rail 4.

The air intake circuit 2 comprises, in an upstream to downstream direction, i.e. in the direction of air flow, an air intake line 5, a compressor 6 of a turbocharger 7 of the engine 1, a compressor-intake manifold connecting line 8, and a distributor or intake manifold 9. Naturally, the intake circuit 2 can include other components that are not shown here, for example an air filter, supercharged air cooler, etc.

The engine 1 is also equipped with an exhaust circuit 10 for exhaust gases, or exhaust line 10, comprising, from upstream to downstream, i.e. in the direction of gas flow: an exhaust manifold 11, a turbine 12 of the turbocharger 7, a first post-treatment system 13, for example an oxidation catalytic converter 13 and/or a particulate filter 13, a first system-flow meter connecting line 14, a flow meter 15 designed to measure an exhaust gas flow rate value $Q_{ech}$, a second post-treatment system 16, for example an $NO_x$ trap 16, a third post-treatment system 17, in this case a selective reduction catalyst for nitrogen oxides 17 (also referred to as an SCR catalytic converter), and an exhaust box 18. Naturally, other arrangements are possible without adversely affecting general nature of the invention. For example, the exhaust circuit can have an SCR catalytic converter 17 instead of the $NO_x$ trap 16 to treat nitrogen oxides emitted by the engine. For example, the $NO_x$ trap 16 can be associated with the oxidation catalytic converter 13 in a single metal envelope, or the SCR catalytic converter 17 can be associated with a particle filter in a single metal envelope, etc.

The NO trap 16 can be associated with a temperature sensor 19 mounted upstream of the same. The SCR catalytic converter can also be associated with a temperature sensor 20 mounted upstream of the same. These notably make it possible to adjust treatment efficiency using specific measures if the temperature is below a threshold.

To reduce nitrogen oxides emitted in combustion gases of the engine 1 in the SCR catalytic converter 17, the SCR catalytic converter 17 is supplied with urea-based reducing agent (Adblue®) by means of an injection device 21, for example a mixer 21 positioned upstream of the SCR catalytic converter 17, from a tank 22. A regulating valve 23 is used to continuously adjust a flow rate of reducing agent $Q_{NH3,SCR,in}$ injected.

To implement the method according to the invention, the exhaust circuit 10 also has means 24 for measuring a concentration of nitrogen oxides $[NO_x]_{tp}$ in the gases discharged into the external environment, i.e. at an outlet of the exhaust box 18. This is preferably a nitrogen oxide sensor 24.

Multiplying the flow rate of exhaust gases $Q_{ech}$, for example determined using a flow meter 15, by the concentration of nitrogen oxides $[NO_x]_{tp}$ measured by the sensor 24, determines a flow rate of nitrogen oxides discharged into the atmosphere for the current operating point of the engine 1.

The exhaust circuit 10 also includes a partial recycling circuit for exhaust gases at a high-pressure intake, also referred to as a high-pressure exhaust gas recycling or EGR HP circuit 25. This is a line 25 that begins at a point of the exhaust circuit 10 upstream of the turbine 12, in this case between the exhaust manifold 11 and the turbine 12. The other end of the line leads to a point downstream of the compressor 6 in the compressor-intake manifold connecting line 8. This is fitted with a partial high-pressure exhaust gas recycling valve 26, also known as an EGR HP valve 26, that can be set to regulate a proportion of high-pressure gas recycled at the intake.

In this case, the exhaust circuit 10 also has a partial recycling circuit for exhaust gases at a low-pressure intake 27, referred to as an EGP BP circuit 27. This is a line 27 that leads from a point of the exhaust circuit downstream of the turbine 12, in this case and without limitation at an outlet of the first post-treatment system 13 at a point of the first system-flow meter connecting line 14. The other end thereof leads to a point upstream of the compressor 6, in the air intake line 5. This is fitted with a partial low-pressure exhaust gas recycling valve 28, also known as an EGR BP valve 28, that can be set to regulate a proportion of low-pressure gas recycled at the intake.

The motorization device also includes control means (not shown), for example an electronic processor that is designed to adjust operating parameters of the motorization device, notably of the engine 1, of the $NO_x$ trap 16 and of the SCR catalytic converter 17, as a function notably of a torque setpoint C corresponding to a depression of an accelerator pedal by a driver of the vehicle, of a speed of the engine N and of a water temperature value $T_{eau}$. In a known manner, the processor adjusts the air intake and the proportion of high-pressure and low-pressure exhaust gases recycled at the intake, fuel injection in the engine, and the flow rate of reducing agent $Q_{NH3,SCR,in}$ injected upstream of the SCR catalytic converter 17. The processor can also adapt frequency and/or duration of purge of the $NO_x$ trap 16, for example by adjusting nitrogen oxide mass thresholds that trigger a rich mix purge.

Figure 3:
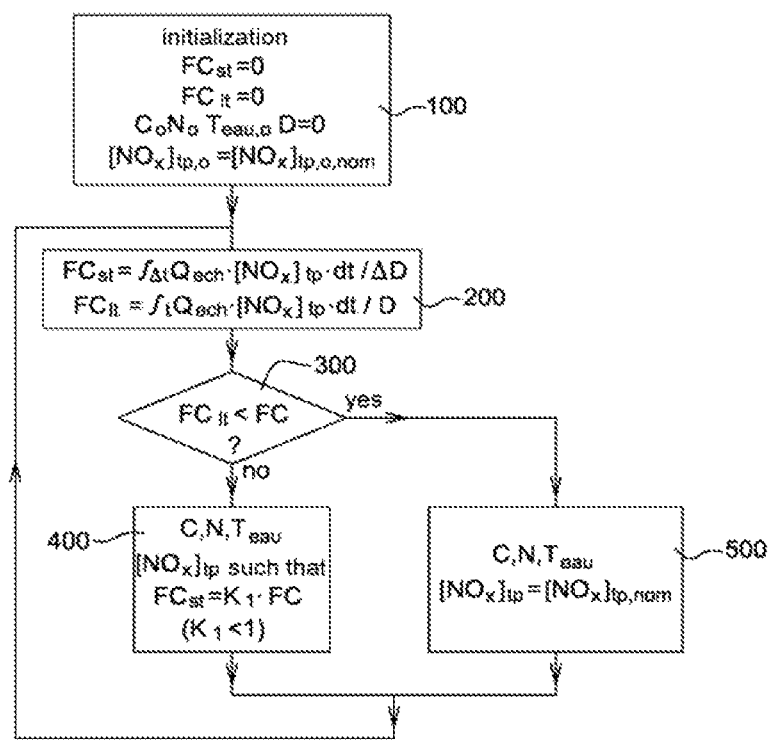
FIG. 3 is a flowchart showing different stages of the method according to one embodiment of the invention.

FIG. 3 shows stages of a non-limiting embodiment of the method according to the invention.

The method includes a prior step in which two conformity factors are determined:

A short-term conformity factor $FC_{st}$, which is equal to a value representative of a mass of nitrogen oxides emitted by the vehicle (i.e. at the outlet of the exhaust box 18) over a fixed elementary distance $\Delta D$ of a journey of the vehicle is defined, for example using equation 2 below:

$$FC_{st}=(\int_{\Delta t}Q_{ech}\times[NO_x]_{tp}\times dt)/\Delta D \qquad \text{(Equation 2)}$$

in which:

$Q_{ech}$ is the flow rate of exhaust gases, for example measured using the flow meter 15, $[NO_x]_{tp}$ is the concentration of nitrogen oxides in exhaust gases at the outlet of the exhaust box, for example measured by the nitrogen oxide sensor 24, and $\Delta t$ is the integration time, equal to the time that the vehicle takes to travel the fixed elementary distance $\Delta D$. To determine the integration time, i.e. the time after which the integral calculation is stopped, a time integral of a speed V of the vehicle (measured by a sensor, not shown) can for example be calculated, with the calculation being stopped when this time integral of the speed reaches a value equal to the distance $\Delta D$. Unlike the elementary distance $\Delta D$, this duration $\Delta t$ is not usually fixed, but depends on driving type.

A long-term conformity factor FClt, which is equal to a value representative of a mass of nitrogen oxides emitted by the vehicle (at the outlet of the exhaust box 18) over the distance D traveled by the vehicle after the vehicle is started is also defined, for example using equation 3 below:

$$FC_{lt}=(\int_{t}Q_{ech}\times[NO_x]_{tp}\times dt)/D \qquad \text{(Equation 3)}$$

in which:

$Q_{ech}$ is the flow rate of exhaust gases, for example measured using the flow meter 15, $[NO_x]_{tp}$ is the concentration of nitrogen oxides in exhaust gases at the outlet of the exhaust box, for example measured by the nitrogen oxide sensor 24, and t is the integration time, equal to the time that the vehicle takes to travel the distance D. This distance D and this duration t are in this case calculated iteratively at each calculation step of the method by adding the previous distance value to the elementary distance value $\Delta D$ and the previous duration t to the integration time $\Delta t$ corresponding to the elementary distance $\Delta D$ of the previous calculation step.

To reiterate, the method according to the invention is intended to keep a mean quantity of nitrogen oxides per traveled kilometer that is emitted by the vehicle below a fixed predetermined threshold, over any sufficiently long journey of a vehicle. In other words, the method is intended to keep the long-term conformity factor $FC_{lt}$ below a predetermined conformity factor threshold FC, regardless of evolution of the parameters representative of an operating point of the engine, over any journey. However, as a result of low efficiency E of the post-treatment systems 16, 17 at low temperatures, for example below an operating temperature of approximately 170° C. for an $NO_x$ trap 16 or approximately 200° C. for an SCR catalytic converter 17, the method can only be used for a sufficiently long journey. Sufficiently long shall mean that temperature of the system 16, 17, as measured by the related temperature sensor 19, 20, has had at least enough time to reach the operating temperature in question.

The method starts with an initialization stage 100 during which the engine is started and the journey of the vehicle begins. The short-term conformity factor $FC_{st}$, the long-term conformity factor $FC_{lt}$ and the distance traveled since the start of the journey D have zero values. A set of parameters representative of the operating point of the engine, for example a torque setpoint value Co (resulting for example from a depression of the accelerator pedal of the vehicle), an engine speed value No, and a water temperature value $T_{eau,0}$ is determined. The engine is set to a nominal setting (air quantity $Q_{air}$ and recycled gas quantity $Q_{EGR}$ values, fuel flow rate $Q_f$ and crankshaft injection angle $\theta_f$) and the post-treatment system 16, 17 is set to a nominal efficiency value. These settings correspond to a nominal nitrogen oxide concentration value $[NO_x]_{tp,nom}$. These settings usually do not minimize absolute nitrogen oxide emissions, but provide a compromise between emissions of different pollutants (notably a compromise with soot particle emissions), fuel consumption, etc. in order to limit nitrogen oxide emissions to legal conformity thresholds and to limit the emissions under all common usage conditions of the vehicle in terms of outside temperature range, altitude, driving conditions during urban and extra-urban use, etc.

The following stages of the method are carried out iteratively, at each additional step of elementary distance ΔD traveled by the vehicle. The method ends at the end of the journey of the vehicle, i.e. when the driver stops the engine. If the engine is fitted with an automatic stop-and-start system, a stop caused by the system, i.e. a stop not caused voluntarily by the driver, does not interrupt the method.

The method continues with a stage 200 for calculating the short-term conformity factor $FC_{st}$ and the long-term conformity factor $FC_{lt}$, as detailed above.

The method continues with a stage 300 for comparing the long-term conformity factor $FC_{lt}$ with the conformity factor threshold FC. If the long-term conformity factor is greater than the threshold, the method skips to stage 400, in which the following values of the parameters representative of the operating point of the engine are determined (torque setpoint C, engine speed N, water temperature $T_{eau}$), and the engine 1 and/or the post-treatment system 16, 17 are set to a value other than the nominal setting, for these values of the current parameters representative of the operating point of the engine.

More specifically, the setting and therefore the nitrogen oxide concentration $[NO_x]_{tp}$ is adjusted such that, over the following elementary distance Δd, the short-term conformity factor $FC_{st}$ is strictly below the conformity factor threshold FC. For example, with reference to the embodiment shown in FIG. 3 and without limitation, the short-term conformity factor $FC_{st}$ can represent a fixed percentage $K_1$ of the conformity factor threshold FC strictly below 1, for example 90% (i.e. 0.9).

In a known manner, a proportion of low- and/or high-pressure exhaust gas recycled at the intake can be increased. The flow rate of reducing agent injected into the SCR catalytic converter 17 can also be modified, etc.

In the opposite case, i.e. if the long-term conformity factor $FC_{lt}$ is below the conformity factor threshold FC, the method skips to stage 500, in which the engine 1 and the post-treatment system 16, 17 remain in the nominal setting. In other words, the quantity of nitrogen oxides emitted is not controlled as a function of the conformity factor threshold FC.

After stage 400 or 500, the method returns to stage 200, until the end of the journey of the vehicle. It can be understood from the foregoing that, after each stage 400, the vehicle emits a single mean quantity of nitrogen oxide per kilometer that is less than the maximum permissible mean quantity for the entire journey, which consequently reduces value of the following long-term conformity factor $FC_{lt}$ calculated in the step following stage 200. Nonetheless, since this long-term conformity factor takes into account the entire history of the journey of the vehicle, from the start of the journey, the value thereof changes relatively slowly at each calculation step, such that it may be necessary to perform several consecutive iterations of step 400 to bring this long-term conformity factor $FC_{lt}$ below the threshold FC. Once this is the case, it can be seen from stage 500 that a less restrictive nominal setting can be used, in which the short-term conformity factor $FC_{st}$ is no longer controlled, which can cause the long-term conformity factor $FC_{lt}$ to rise slightly above the threshold FC if the nominal setting of the operating point results in very high nitrogen oxide emissions. In this case, with the method restarting at stage 200, the long-term conformity factor $FC_{lt}$ is nonetheless kept near the threshold FC in all cases, i.e. slightly below or slightly above the threshold.

Variants of the method, not shown in FIG. 3, in which the long-term conformity factor $FC_{lt}$ is kept systematically below the conformity factor threshold FC, and not just near the threshold, are possible.

In a first variant, the threshold FC in stage 300 can be replaced with a second conformity factor threshold FC' that has sufficient margin in relation to the threshold FC, which is actual target for the upper limit, and more specifically the factor FC' that is lower than the conformity threshold FC. For example, the margin applied can be equal to the largest possible value of the short-term conformity factor $FC_{st}$ that can be calculated at the nominal setting of all of the operating points of the engine.

In a second variant, the nominal setting in stage 500 can be replaced with a setting in which the nitrogen oxide setting $[NO_x]_{tp}$ is such that the short-term conformity factor $FC_{st}$ is equal to the conformity factor threshold FC. The result of this is to cause the long-term conformity factor $FC_{lt}$ to stabilize at or slightly below the value of the threshold after dropping to or below the threshold.

In a third variant, the stages of the methods are performed on sliding windows of the fixed elementary distance ΔD traveled by the vehicle. More specifically, the fixed elementary distance ΔD is split into a multiple n of successive elementary sub-distances Δd of identical value, for example four elementary sub-distances Δd, each of which is equal to one quarter of the elementary distance ΔD. Steps 200 and 500 of the method are performed at each step of sub-distance Δd traveled and not at each step of distance ΔD traveled, i.e. n times more frequently, calculating the short-term conformity factor $FC_{st}$ in the same manner as indicated above, i.e. for the elementary distance ΔD just traveled. In other words, in stage 200, each time a new elementary sub-distance Δd is traveled, a new short-term conformity factor value $FC_{st}$ is calculated in a different memory of the processor, and the setting of the engine 1 and/or of the post-treatment system 16, 17 is adjusted in stage 400 each time that a sub-distance Δd is traveled, if the long-term conformity factor $FC_{lt}$ calculated in stage 200 is greater than the conformity factor threshold FC.

The advantage of such an embodiment is significantly smoother behavior of the calculation algorithm, which performs fewer to-and-fro switches between two different settings since each new setting decision (after a new sub-distance Δd has been traveled, i.e. n times more often, for example four times more often, than with the first embodiment described with reference to FIG. 3) is correlated with the previous decision.

Other embodiments of the method according to the invention can also be advantageously implemented.

For example, if the conformity factor $FC_{lt}$ is significantly greater than the target threshold FC, the factor can be brought to the threshold quicker by incorporating into the method, after stage 400 in which the short-term conformity factor $FC_{st}$ is equal to a first percentage $K_1$ of the threshold FC followed by a stage 200 in which the long-term conformity factor $FC_{lt}$ is determined to still be above the threshold, at least one second setting stage similar to stage 400 in which the short-term conformity factor $FC_{st}$ is equal to a second percentage $K_2$ of the threshold FC, this second percentage $K_2$ being lower than the first.

For example, the second percentage $K_2$ can be equal to 80% if the first percentage $K_1$ is equal to 90%. Adjustment levers can then be activated to obtain different percentages $K_1$ and $K_2$. Preferably, in the first stage (convergence of $FC_{lt}$ on $K_1 \times FC$), emphasis is placed on reducing the nitrogen oxide emissions from the engine $[NO_x]_{eo}$ in relation to the nominal setting, for example by increasing the recycling of exhaust gases. In the second stage (convergence of $FC_{lt}$ on $K_2 \times FC$), the treatment efficiency of the cleaning system 16, 17 is instead enhanced in relation to the nominal setting, for example by additional heating, by modifying injection of reducing agent, etc., this measure potentially being cumulative with the measure taken in the first stage. An alternative to this second stage can also involve limiting power of the engine to prevent the engine from running at high speed and high load, these operating points corresponding to the highest emissions of nitrogen oxides. In other words, despite a high torque demand C from the driver resulting from a significant depression of the accelerator pedal, the processor limits the torque parameter corresponding to the operating point of the engine to a predetermined maximum value.

In this latter case in which at least two different settings are provided for the nominal setting, variants to performance of stage 500 shown in FIG. 3 are also possible. For example, if stage 300 determines that the long-term conformity factor $FC_{lt}$ has dropped below the threshold FC only following application of the second setting in which the short-term conformity factor $FC_{st}$ is equal to the second percentage $K_2$ of the threshold FC, the setting in stage 500 can then be such that the short-term conformity factor $FC_{st}$ is equal to the first percentage $K_1$ of the threshold FC such as to further limit the emissions of nitrogen oxides. Naturally, the person skilled in the art can combine several of the variants described explicitly herein or adapt the same without thereby moving outside the scope of the invention.

The invention claimed is:

1. A method for controlling emissions of nitrogen oxides at an outlet of an exhaust box of a motor vehicle fitted with an internal-combustion engine associated with at least one post-treatment system for nitrogen oxides emitted in combustion gases of the internal-combustion engine, including at least one stage for determining a mean quantity of nitrogen oxides per traveled kilometer emitted by the motor vehicle from a start of a journey to a time the motor vehicle is stopped, the method comprising, iteratively at each step of a fixed elementary distance traveled, from the start of the journey and until the motor vehicle is stopped:
   a stage in which a short-term conformity factor equal to a mean quantity of nitrogen oxides per traveled kilometer emitted over the fixed elementary distance that has just been traveled, and a long-term conformity factor equal to a mean quantity of nitrogen oxides per traveled kilometer over a distance traveled from the start of the journey are calculated,
   a stage in which the long-term conformity factor is compared to a threshold, and
   a stage in which, when the long-term conformity factor is greater than the threshold:
      (i) a set of parameters representative of an operating point of the internal-combustion engine is determined, the set of the parameters including at least a torque of the internal-combustion engine, a speed of the internal-combustion engine and a water temperature of the internal-combustion engine, and
      (ii) at least one of the internal-combustion engine and the post-treatment system is set to provide a concentration of nitrogen oxides at the outlet of the exhaust box of the motor vehicle, the concentration of nitrogen oxides ensuring that the short-term conformity factor determined in a following step is strictly below the threshold.

2. The method as claimed in claim 1, wherein the short-term conformity factor determined in the following step is equal to a fixed predetermined percentage of the threshold, the fixed predetermined percentage being strictly less than 1.

3. The method as claimed in claim 1, wherein the setting of at least one of the internal-combustion engine and the post treatment system includes increasing a quantity of high- and/or low-pressure exhaust gas recycled at an intake of the internal-combustion engine.

4. The method as claimed in claim 1, wherein the setting of at least one of the internal-combustion engine and the post treatment system includes increasing a temperature of the post-treatment system.

5. The method as claimed in claim 1, wherein the setting of at least one of the internal-combustion engine and the post treatment system includes increasing frequency and/or duration of purges of an $NO_x$ trap associated with the internal-combustion engine.

6. The method as claimed in claim 1, wherein the setting of at least one of the internal-combustion engine and the post treatment system includes increasing a flow rate of reducing agent injected into a selective reduction catalyst for nitrogen oxides associated with the internal-combustion engine.

7. The method as claimed in claim 1, wherein the setting of at least one of the internal-combustion engine and the post treatment system includes limiting power of the internal-combustion engine.

8. The method as claimed in claim 1, wherein the method is implemented iteratively at each elementary sub-distance of the elementary distance.

9. The method as claimed in claim 1, wherein the method also includes, when the long-term conformity factor is below the threshold, a stage in which:
   (i) a set of parameters representative of the operating point of the internal-combustion engine is determined, the set of the parameters including at least the torque, the speed and the water temperature, and
   (ii) the internal-combustion engine and the post-treatment system are set to a nominal setting mode as a function of the parameters, the nominal setting mode corresponding to a nominal concentration of nitrogen oxides independent of a target short-term conformity factor.

10. The method as claimed in claim 1, wherein the method also includes, when the long-term conformity factor is below the threshold, a stage in which:
   (i) a set of parameters representative of the operating point of the internal-combustion engine is determined, the set of the parameters including at least the torque, the speed and the water temperature, and
   (ii) at least one of the internal-combustion engine and the post-treatment system is set to provide a concentration of nitrogen oxides, the concentration of nitrogen oxides ensuring that the short-term conformity factor determined in the following step is equal to the threshold.

* * * * *